(12) United States Patent  
Bienvenu et al.

(10) Patent No.: US 11,833,628 B2  
(45) Date of Patent: Dec. 5, 2023

(54) ASSEMBLY OF AN OUTLET GUIDE VANE FOR AN AIRCRAFT TURBOMACHINE USING AN INFLATABLE BLADDER

(71) Applicant: SAFRAN AIRCRAFT ENGINES, Paris (FR)

(72) Inventors: Steven Gérard Joseph Bienvenu, Moissy-Cramayel (FR); Clément René Roger Sirot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 112 days.

(21) Appl. No.: 17/434,044

(22) PCT Filed: Feb. 21, 2020

(86) PCT No.: PCT/FR2020/050328  
§ 371 (c)(1),  
(2) Date: Aug. 26, 2021

(87) PCT Pub. No.: WO2020/174163  
PCT Pub. Date: Sep. 3, 2020

(65) Prior Publication Data  
US 2022/0134493 A1 May 5, 2022

(30) Foreign Application Priority Data

Feb. 27, 2019 (FR) ...................... 1901996

(51) Int. Cl.  
*B23P 15/04* (2006.01)  
*B29C 65/48* (2006.01)  
(Continued)

(52) U.S. Cl.  
CPC .......... *B23P 15/04* (2013.01); *B29C 65/4835* (2013.01); *B29C 65/7805* (2013.01); (Continued)

(58) Field of Classification Search  
CPC .... B23P 15/04; F05D 2230/68; F01D 25/285; F01D 25/28; B29C 70/44  
See application file for complete search history.

(56) References Cited

U.S. PATENT DOCUMENTS 5,384,959 A * 1/1995 Velicki .................... B23P 15/04  
                                                                29/889.71  
6,003,756 A * 12/1999 Rhodes ................. B23K 20/02  
                                                              144/350

(Continued)

FOREIGN PATENT DOCUMENTS

EP     1798418 A2 * 6/2007 ............. B29C 43/10  
EP     3434867 A1   1/2019

OTHER PUBLICATIONS

Search Report issued in French Patent Application No. 1901996 dated Oct. 31, 2019.

(Continued)

*Primary Examiner* — Jacob J Cigna  
(74) *Attorney, Agent, or Firm* — Pearne & Gordon LLP

(57) ABSTRACT

A method of assembling a member and a cap of a vane using a tool which allows the application of a pressing force of the cap against the member during a step of polymerisation by heating a resin for bonding these components. To this end, the tool includes an inflatable bladder and a pocket which surrounds the bladder and the vane so that the inflated bladder applies the pressing force. The heating can be carried out by resistors which are mounted in the bladder and/or using a device for supplying external heat.

11 Claims, 2 Drawing Sheets

(51) Int. Cl.
*B29C 65/78* (2006.01)
*B29C 65/00* (2006.01)
*F01D 5/14* (2006.01)

(52) U.S. Cl.
CPC ........ *B29C 66/81455* (2013.01); *F01D 5/147* (2013.01); *F05D 2220/323* (2013.01); *F05D 2230/23* (2013.01); *F05D 2240/12* (2013.01)

(56) References Cited

U.S. PATENT DOCUMENTS

| | | | | |
|---|---|---|---|---|
| 6,419,146 | B1* | 7/2002 | Buldhaupt | B64C 1/12 |
| | | | | 29/6.1 |
| 7,021,899 | B2* | 4/2006 | Ferte | F01D 5/147 |
| | | | | 416/232 |
| 7,278,208 | B2* | 10/2007 | Le Saint | F01D 11/122 |
| | | | | 29/402.09 |
| 8,182,233 | B2* | 5/2012 | Goldfinch | F04D 29/023 |
| | | | | 416/97 R |
| 8,986,490 | B2* | 3/2015 | Strother | B23K 20/18 |
| | | | | 425/405.2 |
| 9,874,103 | B2* | 1/2018 | Leconte | B23K 9/167 |
| 10,190,442 | B2* | 1/2019 | Diwinsky | F01D 5/005 |
| 2010/0196637 | A1* | 8/2010 | Lippert | F16C 7/026 |
| | | | | 428/36.1 |
| 2010/0239427 | A1* | 9/2010 | Strother | F04D 29/324 |
| | | | | 228/173.6 |
| 2013/0309096 | A1 | 11/2013 | Le Bras et al. | |
| 2014/0241897 | A1* | 8/2014 | Bales | B23K 1/0018 |
| | | | | 228/256 |
| 2016/0076387 | A1* | 3/2016 | Chauvin | F01D 25/285 |
| | | | | 156/423 |
| 2017/0044934 | A1* | 2/2017 | Hicklin | F01D 11/127 |
| 2019/0032674 | A1* | 1/2019 | Bales | F01D 25/285 |

OTHER PUBLICATIONS

International Search Report for issued in Application No. PCT/FR2020/050328 dated May 25, 2020.
Written Opinion for PCT/FR2020/050328 dated May 25, 2020.

* cited by examiner

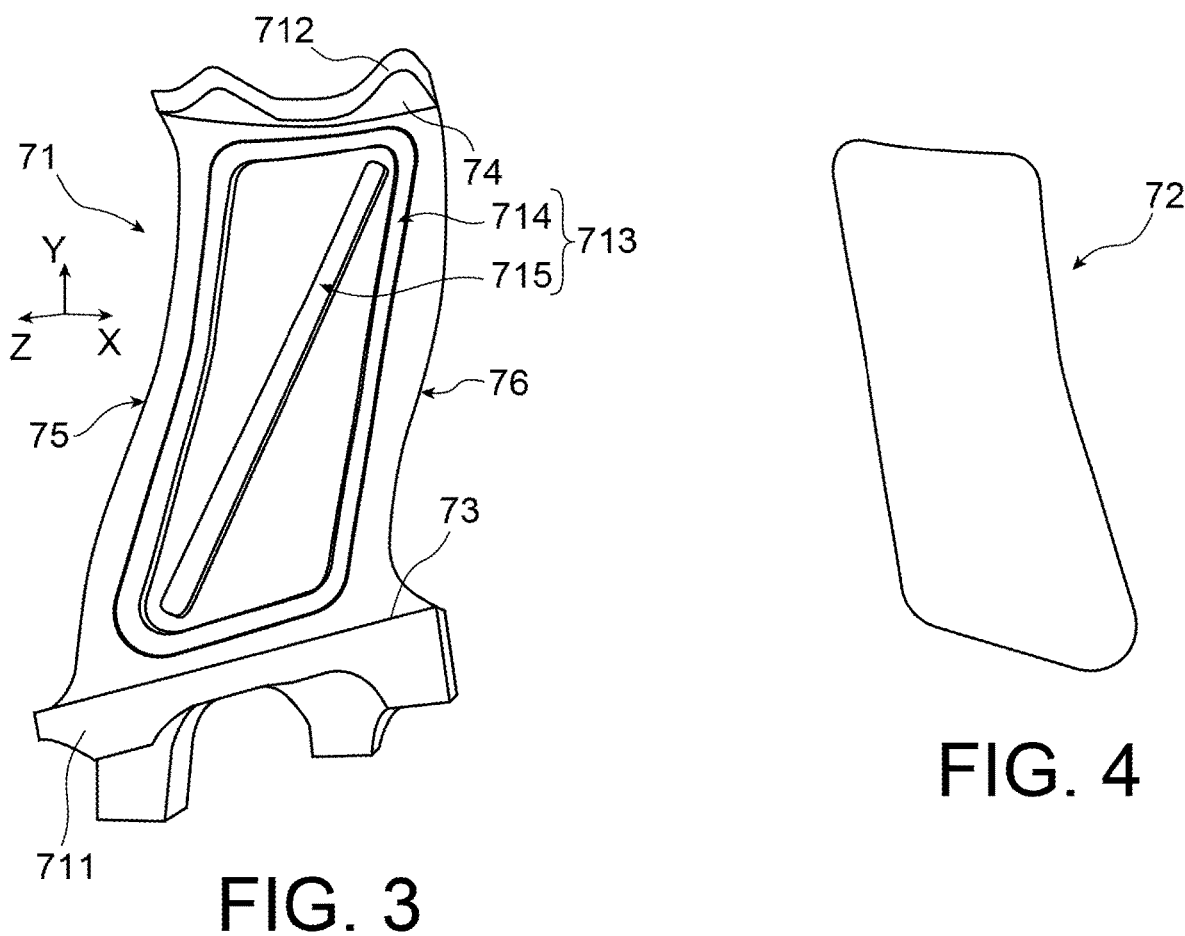
FIG. 3
FIG. 4
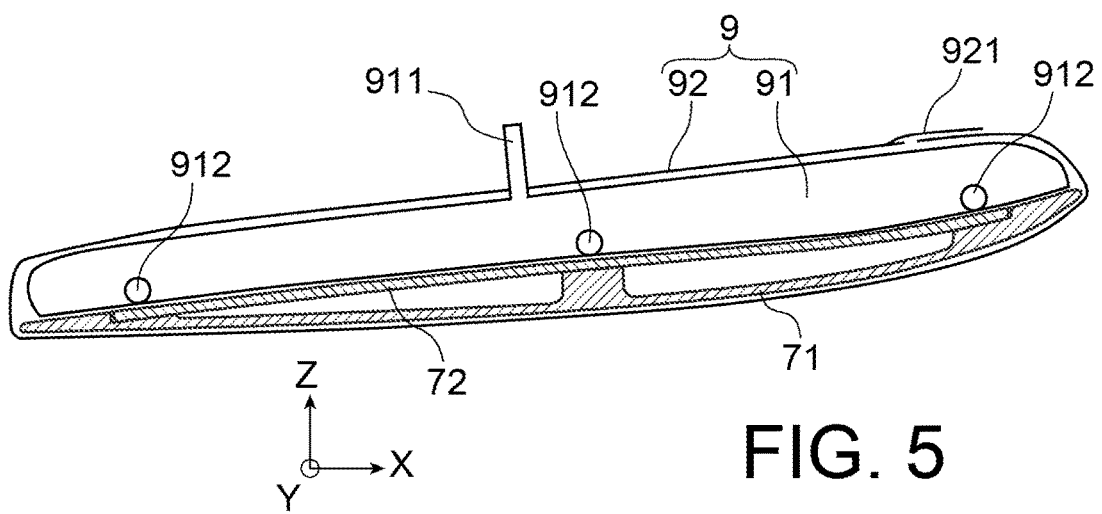
FIG. 5

ASSEMBLY OF AN OUTLET GUIDE VANE FOR AN AIRCRAFT TURBOMACHINE USING AN INFLATABLE BLADDER

This is the National Stage of PCT international application PCT/FR2020/050328, filed on Feb. 21, 2020 entitled "ASSEMBLY OF AN OUTLET GUIDE VANE FOR AN AIRCRAFT TURBOMACHINE USING AN INFLATABLE BLADDER", which claims the priority of French Patent Application No. 1901996 filed Feb. 27, 2019, both of which are incorporated herein by reference in their entirety.

TECHNICAL FIELD

This invention relates to the field of twin-spool turbojet type aircraft turbomachines, and in particular to the manufacture of guide vanes exposed to the bypass air flow circulating in the bypass flow stream of such a turbojet.

These guide vanes are preferably configured to form Outlet Guide Vanes (OGV) designed to straighten the bypass air flow from the turbojet outlet.

STATE OF PRIOR ART

Manufacturing of an outlet guide vane generally requires the assembly of two prefabricated parts. One of these pieces forms a body of the vane that comprises hollow sections configured to reduce its mass. This body comprises in particular a first external face forming an extrados of the vane. The other part is a cap arranged to be fixed onto the body in such a way as to form an intrados of the vane, with a second external face of the body.

In the state of prior art, the body and the cap are usually fixed together by bonding these parts using a polymerisable resin. Polymerisation involves heating the resin, typically to a temperature between 160° C. and 180° C., in a configuration in which the cap is held in contact with the body.

To achieve this, one conventional technique consists of placing the body and the cap in an airtight pouch, creating a vacuum in the pouch, and then heating this assembly inside an autoclave. In particular, the creation of a vacuum inside the pouch prevents the appearance of porosity in the polymerised resin joint, such porosity possibly appearing due to the release of gas produced by the resin during its polymerisation. The pressure differential between the inside of the pouch in which a vacuum has been created, and the autoclave chamber makes it possible to generate a force bring the cap into contact with the body, capable of forming a resin joint with optimal thickness, typically between 80 μm and 300 μm, and ensuring good adhesion at the joint-body and joint-cap interfaces. The contact force typically corresponds to a relative pressure equal to between $1*10^5$ Pa and $5*10^5$ Pa.

This technique has several disadvantages. In particular, placing the body and the cap inside the sealed pouch is a long and delicate step during which the pouch can be perforated or torn. At this stage of manufacturing of the vane, the body and the cap typically comprise sharp edges or sharp protrusions. A perforation or a tear in the pouch makes it impossible to create a vacuum inside the pouch and to bring the body and the cap into contact correctly, which typically leads to geometric and mechanical defects in the vane. Moreover, such a sealed pouch is a single-use consumable that is virtually impossible to repair, and a previously used pouch may comprise micro-perforations invisible to the naked eye and/or large tears.

This invention aims to eliminate such disadvantages and is intended, in particular, to disclose a method and tooling that can reduce the duration of such an assembly operation.

Another purpose of the invention is to avoid the use of tooling comprising single-use consumables.

Presentation of the Invention

To achieve this, the invention relates to a method of assembling a vane for the outlet guide vane assembly of a twin-spool aircraft turbojet, comprising:
  a step to deposit a polymerisable resin on a junction face of a body of the said vane,
  a step to position a cap of the vane on said junction face covered with said resin such that an external face of the cap and an external face of the body together form an intrados of this vane.
According to the invention, this method comprises:
  a step to arrange an inflatable bladder in contact with the intrados of the vane,
  a step to surround the bladder, the cap and the body with a pouch so as to hold the bladder in contact with the intrados,
  a step to inflate the bladder thus held in contact with the intrados in order to apply a force on the cap to force the cap into contact with said junction face of the body,
  a heating step to polymerise the resin and thus fix the cap on the body of the vane. The use of tooling comprising an inflatable bladder and a surrounding pouch makes it possible to hold the cap in contact with the body during polymerisation of the resin, making it unnecessary to create a vacuum in an airtight pouch. This avoids the disadvantages associated with the use of such an airtight pouch. In particular, the time required to install the bladder and the pouch according to the invention, in other words the duration of the steps to place, surround and inflate the bladder, can be significantly shorter than the time required to place the body and the cap in a conventional sealed pouch and to create a vacuum inside the pouch.

In addition, the invention makes it possible to polymerise the resin without the specific use of an autoclave. Inflation of the bladder makes it possible for the tooling alone to hold the cap in contact with the body, without requiring a change in the surrounding pressure during heating.

According to a first variant, the heating step may comprise heating the bladder using heating means internal to the bladder, i.e. heating means installed inside the bladder. For example, these heating means may comprise electrical resistances.

According to a second variant, the heating step may comprise an external heat input. Non-limitatively, this external heat input can be provided using an oven, an autoclave, or a radiation or induction heating device.

These two variants can be implemented alone or in combination with each other.

The invention also relates to tooling for implementing such a method, this tooling comprising an inflatable bladder, and a pouch capable of holding the bladder in contact with the intrados so as to apply said force bringing the cap into contact with said junction face of the body.

In order to form a polymerised resin joint conferring the required mechanical properties on the vane, the contact force must be sufficient to achieve satisfactory contact between the cap and the body throughout the implementation of the heating step, which can typically last between one and two hours.

To achieve this, the pouch may have a certain elasticity so that it can be deformed when the bladder is inflated, provided that the force bringing the cap into contact with the body is sufficient to make sure that the contact remains satisfactory during polymerisation.

However, although not mandatory, it is preferable if the pouch is made of a non-stretch material.

In one embodiment by which the method according to the second variant mentioned above can be implemented, the tooling may comprise an external heat supply device such as an oven or a radiation or induction heating device.

Preferably, the bladder may comprise silicone.

Silicone is an advantageous material for implementation of this invention, in particular, such a material can retain its properties when exposed to volatile materials such as those emitted by the heated resin. Furthermore, silicone has good mould stripping properties that facilitates reuse of the bladder.

In one embodiment, the bladder may comprise one or more reinforcements arranged to protect it from sharp edges of the vane.

According to a first variant of this embodiment, the bladder may comprise one or more metal inserts forming one or more of said reinforcements.

According to a second variant of this embodiment, one or more of said reinforcements consist of an overthickness of the bladder.

Other advantages and characteristics of the invention will become clear after reading the following detailed non-limitative description.

BRIEF DESCRIPTION OF THE DRAWINGS

The following detailed description refers to the attached drawings, wherein:

FIG. 3 is a diagrammatic perspective view of a body of the vane in FIG. 2;

FIG. 4 is a diagrammatic perspective view of a cap of the vane in FIG. 2;

FIG. 5 is a diagrammatic cross-sectional view of the vane in FIG. 2 and of a contact and heating tooling according to the invention.

DETAILED PRESENTATION OF EMBODIMENTS

Figure 1:
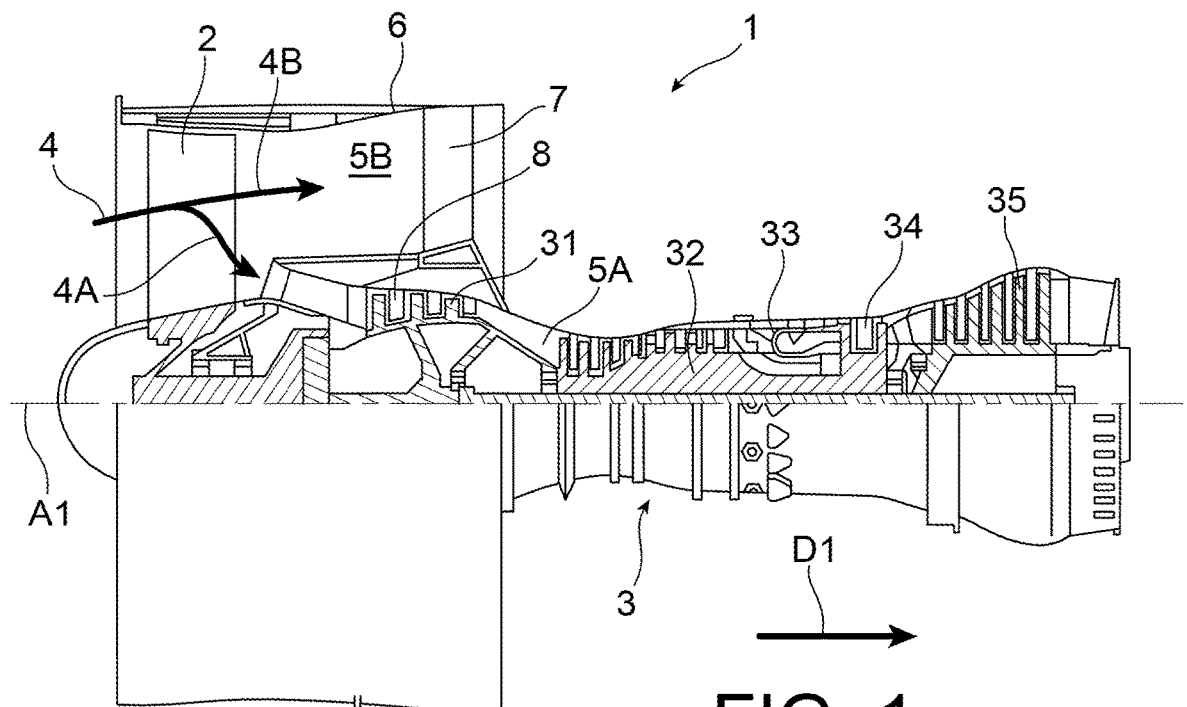
FIG. 1 is an axial diagrammatic half-sectional view of a twin-spool turbojet comprising an outlet guide vane assembly.

With reference to FIG. 1, the figure represents a twin-flow twin-spool turbojet for a commercial aeroplane type aircraft (not represented).

The turbojet 1 has a longitudinal central axis A1 around which its various components extend, in particular in order from upstream to downstream of the turbojet 1, a fan 2 and a gas generator 3. Throughout this description, the terms "upstream" and "downstream" are defined relative to a main gas flow direction D1 within the turbojet 1. The gas generator 3 comprises, in order from upstream to downstream, a low pressure compressor 31, a high pressure compressor 32, a combustion chamber 33, a high pressure turbine 34 and a low pressure turbine 35.

Conventionally, during the operation of such a turbojet 1, an air flow 4 enters the turbojet 1 through an air inlet, passes through the fan 2 and then divides into a central core flow 4A and a bypass flow 4B. The core flow 4A flows into a main gas circulation flow stream 5A passing through the compressors 31 and 32, the combustion chamber 33 and the turbines 34 and 35. The bypass flow 4B flows in a bypass flow stream 5B surrounding the gas generator 3 and radially delimited towards the exterior by an outer shell 6 of the turbojet 1.

In this example, the turbojet 1 comprises a ring of guide vanes 7 extending into the bypass flow stream 5B downstream from the fan 2. These vanes 7 form an outlet guide vane (OGV) assembly that connects the outer shell 6 to a case 8 surrounding the low pressure compressor 31. The vanes 7 are circumferentially spaced from each other and straighten the bypass flow 4B after its outlet from the bypass flow stream 5B. These vanes 7 can also perform a structural function.

The invention relates more specifically to the manufacture of such a vane 7.

Figure 2:
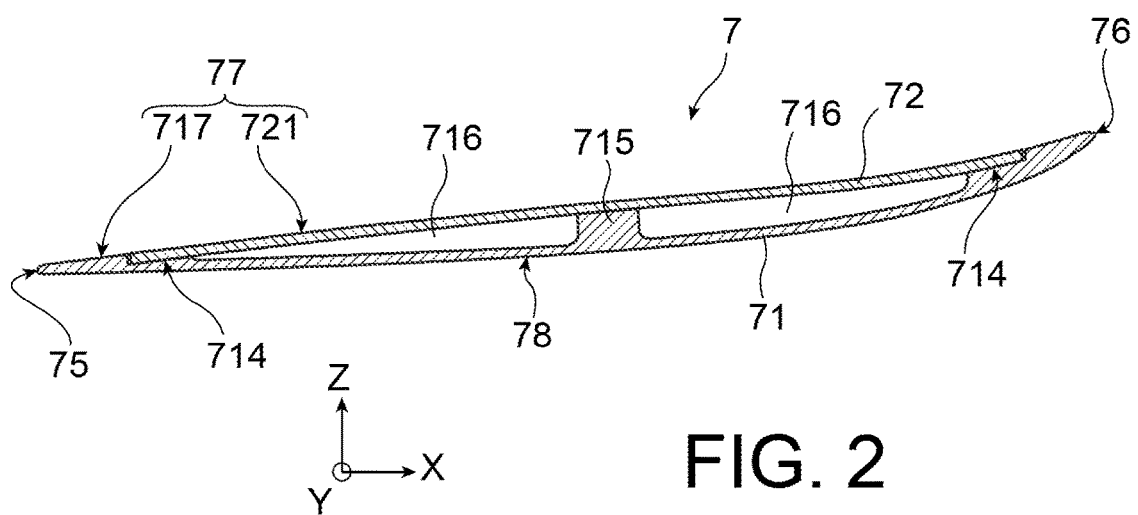
FIG. 2 is a diagrammatic cross-sectional view of a vane for the outlet guide vane assembly of the turbojet shown in FIG. 1.

A vane 7 conforming with the invention is shown in FIG. 2.

In a known manner, manufacturing of such a vane 7 comprises an operation to assemble two prefabricated parts. With reference to FIGS. 2 to 4, one of these parts forms a body 71, and the other part forms a cap 72.

In the example illustrated in FIG. 1, the vane 7 extends radially into the bypass flow stream 5B without axial inclination, i.e. without inclination along the longitudinal axis A1.

In the example in FIG. 3, the body 71 of the vane 7 has an axial inclination, the X-axis of the coordinate system in this figure being substantially parallel to the central longitudinal axis A1 of the turbojet 1 when this vane 7 is mounted on this turbojet 1.

The vane 7 comprises an aerodynamic part, intended to be exposed to the bypass flow 4B.

The aerodynamic part of the vane 7 is located between a root 711 and a tip 712 of this vane 7 (see FIG. 3).

In this example, the root 711 is used to fix the vane 7 to the case 8 of the low pressure compressor 31, while the tip 712 is used to fix this vane 7 onto the outer shell 6.

The root 711 and the tip 712 of the vane 7 each comprises a platform 73 and 74 respectively, these platforms being configured to reconstitute the bypass flow stream 5B, circumferentially between the vanes 7.

With reference to FIGS. 2 and 3, the vane 7 forms a leading edge 75, a trailing edge 76, an intrados 77 and an extrados 78.

The body 71 of the vane 7 is shaped to define a junction face 713 designed to fix the cap 72 to this body 71.

In the example in FIG. 3, the junction face 713 has a peripheral part 714 forming a bulge along the leading edge 75, the root 711, the trailing edge 76, and also the tip 712. This part 714 of the junction face 713 has a substantially rectangular face.

The junction face 713 also comprises a part 715 substantially forming a bulge along a diagonal of the rectangle formed by the part 714.

Between these parts 714 and 715 of the junction face 713, the body 71 comprises hollowed out parts 716 configured to reduce its mass (see FIG. 2).

FIG. 4 shows an internal face of the cap 72 configured to face the junction face 713 of the body 71, in order to fix the cap 72 to the body 71 by bonding part of this internal face of the cap 72 to said junction face 713.

The method of making this assembly according to the invention comprises a step to deposit a polymerisable resin on the junction face 713 of the body 71.

For example, this resin may comprise a thermosetting liquid polymer of the epoxy resin type.

Alternatively or additionally, the resin may be deposited on parts of the cap 72 that will be located facing the junction face 713 after the cap 72 has been positioned on the body 71. It is preferred to deposit the resin on the junction face 713 because this junction face is structurally delimited, unlike the corresponding parts of the internal face of the cap 72, that are arranged on this internal face without any surface discontinuity.

The process comprises a step to position the cap 72 on the junction face 713 of the body 71, after the resin is deposited on this junction face 713 and/or on said corresponding parts of the internal face of the cap 72.

This step to put the cap 72 and the body 71 into position, or to bring them into contact, is done such that an external face 721 of the cap 72 and an external face 717 of the body 71 together form said intrados 77 of the vane 7 (see FIG. 2).

With reference to FIG. 5, the method according to the invention comprises a step to arrange the bladder 91 in contact with the intrados 77 of the vane 7.

This bladder 91 is inflatable and preferably comprises silicone, which makes it possible to form a bladder with sufficient thickness to be deformed by inflation, and large enough to apply the required contact force (see below).

The bladder 91 is configured to apply a force on the cap 72 to bring it into contact with the junction face 713 of the body 71, and thus in contact with the resin covering this junction face 713, for polymerisation by heating. Typically, the contact force corresponds to a stress of $10^5$ Pa.

The bladder 91 in FIG. 5 is sized to cover the entire external face 721 of the cap 72 and a part of said external face 717 of the body 71, such that—at least after inflation—this bladder 91 bears on practically the entire intrados 77 of the vane 7.

In order to hold the bladder 91 in contact with the intrados 77 of the vane 7 by applying said contact force during the heating step (see below), the tooling 9 according to the invention comprises a pouch 92 made in this example from a material making this pouch 92 unstretchable or substantially unstretchable.

For example, the pouch 92 comprises a fabric, which must obviously resist the temperatures to which the tooling 9 is exposed during heating.

After the bladder 91 has been placed against the intrados 77 of the vane 7, the pouch 92 is arranged to surround the bladder 91, the cap 72 and the body 71.

The pouch 92 may comprise opening/closing means 921 such as straps or mechanical clips.

Such tooling 9 can be easily sized so that it can be adapted to conventional vanes with different dimensions.

To achieve this, it is preferable to size the bladder 91 so that its axial extension dimension, along the X axis, is less than the distance between the leading edge 75 and the trailing edge 76 of the vane 7, as shown in FIG. 5. This prevents the bladder 91 from being pinched between the pouch 92 and one of these edges 75 or 76.

The inflation and heating steps of the bladder 91 can be carried out after the pouch 92 has been closed or held in position, either successively or simultaneously.

In this example, the bladder 91 is firstly inflated so as to apply the contact force on the cap 72. The vane 7 and the tooling 9 are then arranged according to the configuration shown in FIG. 5.

To achieve this, the bladder 91 comprises an inflation channel 911 that can carry an inflation fluid such as compressed air into the bladder 91. The inflation channel 911 may be equipped with a non-return valve (not shown) to keep the inflation fluid inside the bladder 91. The pressure of the inflation fluid inside the bladder 91 can be checked using a pressure gauge (not shown).

In this example, the heating step is then implemented to polymerise the resin and thus fix the cap 72 to the body 71.

The inflation and heating steps can be initiated simultaneously or delayed, depending on the heating means or conditions. For example, the heating step can be initiated before the inflation stage is initiated, or during inflation, if possible depending on the heating and inflation means. Initiation of the heating step before inflation is finalised may be advantageous in particular when the heating means require a relatively long temperature rise time.

In the example in FIG. 5, the bladder 91 comprises internal heating means 912 arranged facing the junction face 713 of the body 71, thus allowing the temperature to be increased selectively in the vicinity of the resin.

The internal heating means 912 are for example electrical resistors.

Such internal heating means 912 may be insufficient to reach the temperature required to polymerise the resin, typically between 160° C. and 180° C.

Thus, an external heat-supply device (not shown) capable of contributing to polymerisation of the resin may be used. For example, this heat supply device may consist of an oven inside which the tooling 9 and the vane 7 are placed, or a radiation or induction heating device.

In another embodiment, not shown, the heating step can only be done using an external heat supply device, since in this case the bladder 91 does not comprise any internal heating means.

The assembly of the body 71 and the cap 72 according to the invention is generally made at a stage at which machining of these parts is not completed, so that these parts may comprise sharp edges or sharp protrusions, that could damage the bladder 91.

The bladder 91 may comprise one or more reinforcements such as metal inserts to protect the bladder 91 from sharp edges of the vane 7. The bladder 91 may also comprise an overthickness constituting such reinforcements, and/or housing such metal inserts or equivalent reinforcement means.

What is claimed is:

1. A method of assembling a vane for an outlet guide vane assembly of a twin-spool aircraft turbojet, the method comprising:
   a step to deposit a polymerisable resin on a junction face of a body of the said vane,
   a step to position a cap of the vane on said junction face covered with said resin such that an external face of the cap and an external face of the body together form an intrados of this vane,
   a step to arrange an inflatable bladder in contact with the intrados of the vane,
   a step to surround the bladder, the cap and the body with a pouch so as to hold the bladder in contact with the intrados such that the pouch is in contact with the bladder and the body,
   a step to inflate the bladder thus held in contact with the intrados in order to apply a force on the cap to force the cap into contact with said junction face of the body, and
   a heating step to polymerise the resin and thus fix the cap on the body of the vane.

2. The method according to claim 1, wherein the heating step comprises heating the bladder using heating means internal to the bladder.

3. The method according to claim 1, wherein the heating step comprises an external heat input.

4. An apparatus comprising a tooling adapted to perform the method according to claim 1, the tooling comprising the inflatable bladder and the pouch, the pouch being adapted to hold the bladder in contact with the intrados so as to apply said force bringing the cap into contact with said junction face of the body.

5. The apparatus according to claim 4, wherein the pouch is made of a non-stretch material.

6. The apparatus according to claim 4, wherein the bladder comprises silicone.

7. The apparatus according to claim 4, comprising an external heat supply device.

8. The apparatus according to claim 7, wherein the external heat supply device is at least one of the following: an oven, a radiation heating device, or an induction heating device.

9. The apparatus according to claim 4, wherein the bladder comprises one or more reinforcements arranged to protect it from sharp edges of the vane.

10. The apparatus according to claim 9, wherein the bladder comprises one or more metal inserts forming one or more of said reinforcements.

11. The apparatus according to claim 9, wherein one or more of said reinforcements consist of an overthickness of the bladder.

\* \* \* \* \*